US010629881B2

(12) United States Patent
Lee et al.

(10) Patent No.: US 10,629,881 B2
(45) Date of Patent: Apr. 21, 2020

(54) METHOD FOR WELDING ELECTRODE LEADS OF SECONDARY BATTERY MODULE AND COMPACT SECONDARY BATTERY MODULE USING THE SAME

(71) Applicant: LG CHEM, LTD., Seoul (KR)

(72) Inventors: Bum-Hyun Lee, Daejeon (KR); Seang-Hee Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 127 days.

(21) Appl. No.: 15/533,855

(22) PCT Filed: Dec. 24, 2015

(86) PCT No.: PCT/KR2015/014282
§ 371 (c)(1),
(2) Date: Jun. 7, 2017

(87) PCT Pub. No.: WO2016/105169
PCT Pub. Date: Jun. 30, 2016

(65) Prior Publication Data
US 2017/0331097 A1 Nov. 16, 2017

(30) Foreign Application Priority Data
Dec. 24, 2014 (KR) .................. 10-2014-0188079

(51) Int. Cl.
*H01M 2/20* (2006.01)
*H01M 10/42* (2006.01)
(Continued)

(52) U.S. Cl.
CPC ............. *H01M 2/202* (2013.01); *B23K 26/21* (2015.10); *B23K 26/323* (2015.10);
(Continued)

(58) Field of Classification Search
None
See application file for complete search history.

(56) References Cited

U.S. PATENT DOCUMENTS

2011/0059342 A1 3/2011 Lee et al.
2015/0194708 A1* 7/2015 Kim .................. B23K 26/20
429/90

FOREIGN PATENT DOCUMENTS

JP 2014-328938 A 12/2014
KR 10-2009-0093222 A 9/2009
(Continued)

OTHER PUBLICATIONS

International Search Report for PCT/KR2015/014282 dated Apr. 11, 2016.

*Primary Examiner* — Jonathan Crepeau
(74) *Attorney, Agent, or Firm* — Birch, Stewart, Kolasch & Birch, LLP (57) ABSTRACT

Disclosed is a compact secondary battery module, which includes a cartridge assembly having a plurality of cartridges stacked while accommodating cells, respectively, so that a plurality of lead overlapping portions where leads of adjacent cells overlap with each other are located at a cartridge sidewall with a predetermined pattern; and a sensing housing having a plurality of bus bars located and welded corresponding to the lead overlapping portions, respectively, the sensing housing being capable of being arranged at a side of the cartridge assembly, wherein a first lead of a cell of each lead overlapping portion is configured to have a shorter width than a second lead having a polarity opposite to the first lead as much as a predetermined width, and in a state where the sensing housing is coupled to the cartridge assembly, a corresponding bus bar comes into contact with
(Continued)

the second lead substantially on the same line as the first lead, and the second lead and the bus bar are welded to each other.

18 Claims, 9 Drawing Sheets

(51) Int. Cl.
| | |
|---|---|
| *H01M 10/48* | (2006.01) |
| *B23K 26/323* | (2014.01) |
| *H01M 2/10* | (2006.01) |
| *B23K 26/21* | (2014.01) |
| *H01M 10/0525* | (2010.01) |
| *B23K 101/36* | (2006.01) |
| *B23K 103/10* | (2006.01) |
| *B23K 103/12* | (2006.01) |
| *B23K 103/18* | (2006.01) |

(52) U.S. Cl.
CPC ....... *H01M 2/1016* (2013.01); *H01M 2/1022* (2013.01); *H01M 2/1077* (2013.01); *H01M 2/204* (2013.01); *H01M 2/206* (2013.01); *H01M 10/0525* (2013.01); *H01M 10/425* (2013.01); *H01M 10/48* (2013.01); *H01M 10/482* (2013.01); *H01M 10/486* (2013.01); *B23K 2101/36* (2018.08); *B23K 2103/10* (2018.08); *B23K 2103/12* (2018.08); *B23K 2103/18* (2018.08); *H01M 2010/4271* (2013.01)

(56) References Cited

FOREIGN PATENT DOCUMENTS

| | | |
|---|---|---|
| KR | 10-2010-0109857 A | 10/2010 |
| KR | 10-2013-0076499 A | 7/2013 |
| KR | 10-2013-0108691 A | 10/2013 |
| KR | 10-2014-0056836 A | 5/2014 |
| WO | WO 2006/068366 A1 | 6/2006 |

\* cited by examiner

METHOD FOR WELDING ELECTRODE LEADS OF SECONDARY BATTERY MODULE AND COMPACT SECONDARY BATTERY MODULE USING THE SAME

TECHNICAL FIELD

The present disclosure relates to a method for welding electrode leads of a secondary battery module and a compact secondary battery module using the same, and more particularly, to a method for welding electrode leads and bus bars of a lithium secondary battery module and a lithium secondary battery module using the same.

The present application claims priority to Korean Patent Application No. 10-2014-0188079 filed on Dec. 24, 2014 in the Republic of Korea, the disclosures of which are incorporated herein by reference.

BACKGROUND ART

Along with technical development and increased demands on mobile devices, secondary batteries have been consumed more and more as energy sources. In the past, nickel cadmium batteries or hydrogen ion batteries have been used as secondary batteries, but recently, lithium ion batteries and lithium polymer batteries with a high energy density are widely used.

Among these secondary batteries, a lithium secondary battery using lithium transition metal oxide, lithium complex oxide or the like as a positive electrode active material and ensuring high output and capacity receives a great interest. Generally, a lithium secondary battery has a structure in which an electrode assembly composed of a positive electrode, a separator and a negative electrode is embedded in a sealed container together with an electrolyte.

Meanwhile, the lithium secondary battery includes a positive electrode, a negative electrode, and a separator and an electrolyte interposed therebetween. Depending on which material is used as a positive electrode active material and a negative electrode active material, the lithium secondary battery is classified into a lithium ion battery (LIB), a polymer lithium ion battery (PLIB) and so on. Typically, electrodes of these lithium secondary batteries are formed by applying a positive electrode active material or a negative electrode active material to a current collector such as aluminum or copper sheet, mesh, film, or foil, and then drying the same.

In the secondary battery module, cells accommodated in each cartridge by performing welding, bolting, riveting or the like between cell leads. In addition, when cells are arranged in series or in parallel in the secondary battery module, three members, namely the positive electrode lead made of aluminum, the negative electrode lead made of copper and the bus bar made of copper and disposed for sensing should be electrically connected by using the above method.

According to the prior art, there are various secondary battery modules, and the cartridges of the modules and bus bars for sensing are structured and located in different ways. For this reason, it is difficult to efficiently perform the connection work and the welding quality of the sensing structure is deteriorated. In addition, an unnecessary space of the secondary battery module should be provided for welding or the like, and resultantly energy density of the secondary battery module is lowered.

In addition, secondary battery modules used in energy storage devices or power storage devices have been developed for designing developing secondary battery modules as compact as possible in order to increase energy efficiency or density.

Meanwhile, in the configuration of a general secondary battery module, when welding (especially, laser welding) is performed to electrode leads (Al) (Cu) and bus bars (Cu) of cells, due to the different melting points of materials, generally, base materials are disposed in the order of an aluminum lead, a copper lead and bus bars, and then laser is irradiated from a cell lead for welding. However, if welding is performed in this order, the cell lead may be deformed first by the laser.

DISCLOSURE

Technical Problem

The present disclosure is designed to solve the problems of the related art, and therefore the present disclosure is directed to providing a method for welding electrode leads of a secondary battery module with an improved structure, in which when corresponding electrode leads of adjacent cells of a secondary battery module overlap with each other in contact, the lead made of a different material of a bus bar is partially cut, and the bus bar is located at the cut portion so that the bus bar is welded to a lead made of the same material. The present disclosure is also directed to providing a compact secondary battery module using the method.

Technical Solution

In one aspect of the present disclosure, there is provided a compact secondary battery module, comprising: a cartridge assembly having a plurality of cartridges stacked while accommodating cells, respectively, so that a plurality of lead overlapping portions where leads of adjacent cells overlap with each other are located at a cartridge sidewall with a predetermined pattern; and a sensing housing having a plurality of bus bars located and welded corresponding to the lead overlapping portions, respectively, the sensing housing being capable of being arranged at a side of the cartridge assembly, wherein a first lead of a cell of each lead overlapping portion is configured to have a shorter width than a second lead having a polarity opposite to the first lead as much as a predetermined width, and in a state where the sensing housing is coupled to the cartridge assembly, a corresponding bus bar comes into contact with the second lead substantially on the same line as the first lead, and the second lead and the bus bar are welded to each other.

Preferably, the secondary battery module may further comprise a barrier provided at a side of each cartridge to protect the cell during a welding work.

Preferably, the lead of each cell may be bent at a right angle at about 1 mm from a lead insulation portion in a state of being accommodated in the corresponding cartridge.

Preferably, the welding may be laser welding.

Preferably, in the laser welding, laser may be irradiated substantially perpendicular to the sensing housing.

Preferably, the bus bar and the second lead may be made of copper, and the first lead may be made of aluminum.

Preferably, the sensing housing may further include a battery management system (BMS) circuit board configured to manage voltage and/or temperature data of each cell detected by each bus bar.

Preferably, the sensing housing may be coupled to the cartridge assembly by means of snap-fitting or hooking.

Preferably, the secondary battery module may further comprise a sensing cover coupled to the sensing housing.

Preferably, the sensing cover may be coupled to the sensing housing by means of snap-fitting or hooking.

Preferably, two neighboring cartridges of the cartridge assembly may be coupled to each other by means of hooking.

Preferably, the cartridge assembly may further include an upper cover and a lower cover coupled to cartridges at both ends thereof by means of hooking.

In another aspect of the present disclosure, there is also provided a method for welding electrode leads of a compact secondary battery module, comprising: (a) preparing a plurality of cells having leads which have opposite polarities and are bent in opposite directions so that a first lead is formed to have a shorter width than a second lead as much as a predetermined width; (b) forming a cartridge assembly by stacking a plurality of cartridges accommodating cells, respectively, so that lead overlapping portions where leads of adjacent cells with opposite polarities overlap with each other are formed at a cartridge sidewall with a predetermined pattern; (c) disposing a sensing housing having a plurality of bus bars respectively installed corresponding to the lead overlapping portions at a side of the cartridge assembly so that a corresponding bus bar comes into contact with the second lead substantially on the same line as the first lead; and (d) welding the second lead and the bus bar of each lead overlapping portion.

Preferably, in the step (b), a cartridge having a barrier at each sidewall where the first lead and the second lead are disposed may be used.

Preferably, in the step (a), each lead may be bent at a right angle at about 1 mm from a lead insulation portion of the cell in a state of being accommodated in the corresponding cartridge.

Preferably, the step (d) may use a laser welder.

Preferably, a laser irradiation direction of the laser welder may be substantially perpendicular to the sensing housing.

Preferably, the bus bar and the second lead may be made of copper, and the first lead may be made of aluminum.

In another aspect of the present disclosure, there is also provided a compact secondary battery module, manufactured by the above method.

In another aspect of the present disclosure, there is also provided a secondary battery packing, in the compact secondary battery modules as described above are coupled.

Advantageous Effects

The method for welding electrode terminals of a secondary battery module and the compact secondary battery module using the same according to embodiments of the present disclosure give the following effects.

First, a bending length of the lead of the cell is minimized, and while assembling a structure to which the bus bar is attached is assembled to a side of the cartridge assembly, a lead of the cell made of the same material as the bus bar may be welded to the bus bar so that the materials of the same kind are welded, thereby improving the welding quality of the sensing structure.

Second, an unnecessary space is minimized in the module configuration, so that the module may be compactly constructed to improve the energy efficiency.

Third, since the aluminum lead made of the same material as the bus bar may be cut off, the material cost of the lead may be reduced.

Fourth, it is possible to prevent the damage of the lead by irradiating laser to the bus bar first in a welding irradiation direction, in the order of the welding base material between the cell leads and the bus bar.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
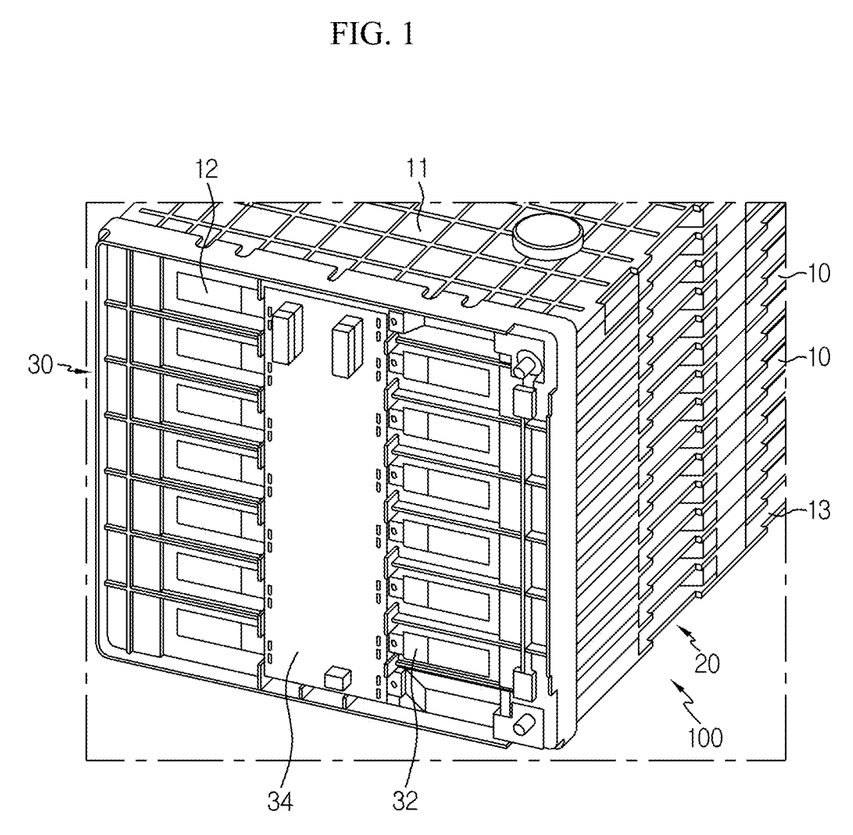
FIG. 1 is a perspective view showing a secondary battery module according to an embodiment of the present disclosure.
Figure 2:
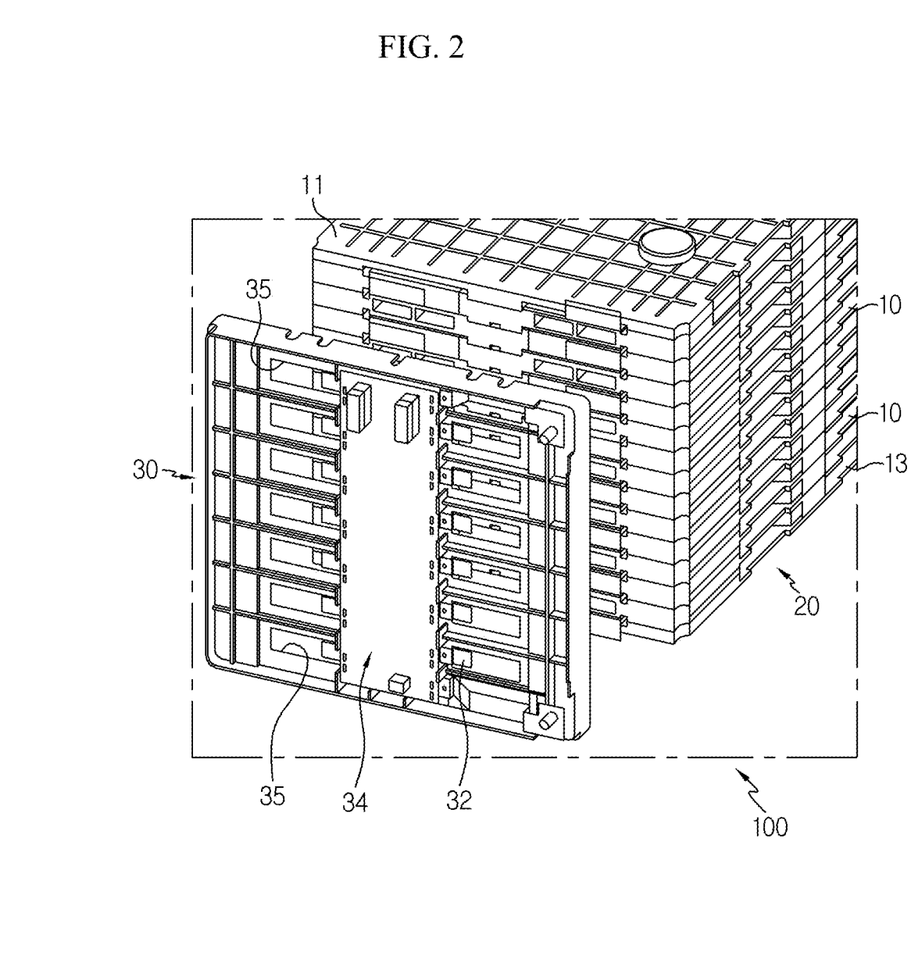
FIG. 2 is an exploded perspective view showing the secondary battery module according to an embodiment of the present disclosure.

FIG. 1 is a perspective view showing a secondary battery module according to an embodiment of the present disclosure, and FIG. 2 is an exploded perspective view showing the secondary battery module according to an embodiment of the present disclosure.

Referring to FIGS. 1 and 2, a compact secondary battery module 100 according to an embodiment of the present disclosure includes a cartridge assembly 20 in which a plurality of cartridges 10 accommodating cells 2, respectively, are stacked, and a sensing housing 30 coupled to a side of the cartridge assembly 20 by means of, for example, one-touch, snap-fitting, hooking or the like.

Figure 6:
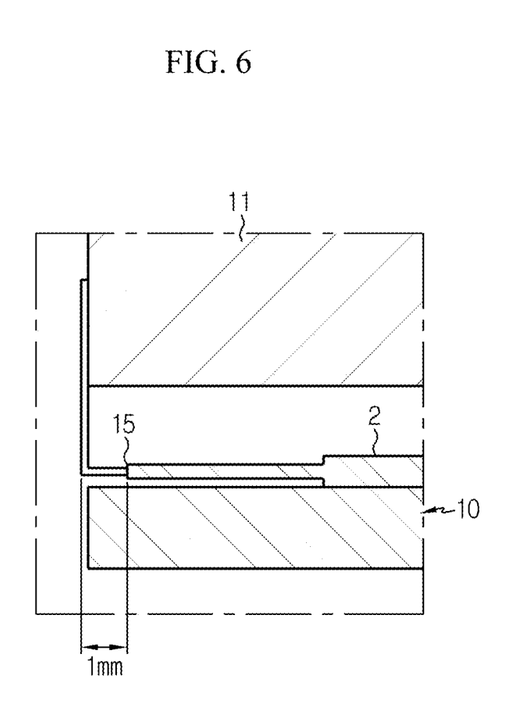
FIG. 6 is a cross-sectioned view showing a curved portion of a lead of a cell of the secondary battery module according to an embodiment of the present disclosure.

The cartridge assembly 20 is prepared by stacking a plurality of cartridges 10 which are made by injection-molding plastic and respectively have an accommodation portion capable of accommodating the cell 2. The cartridges 10 may be coupled to each other by means of snap-fitting or hooking. As shown in FIG. 6, in the cartridge assembly 20, a plurality of lead overlapping portions 16 where leads 12, 14 having opposite polarities of neighboring cells 2, for example a first lead 12 made of aluminum and having a first polarity and a second lead 14 made of copper and having a second polarity opposite to the first polarity, overlap with each other are located at the sidewall of each cartridge 10 with a predetermined pattern.

In addition, the cartridge assembly 20 has an upper cover 11 and a lower cover 13, coupled to the cartridges 10 at both ends by means of, for example, hooking. The upper cover 11 and the lower cover 13 are injection-molded to have substantially the same shape as the individual cartridge 10 of the cartridge assembly 20, respectively. It will be understood by those skilled in the art that the upper cover 11 and the lower cover 13 have a function of protecting the cell 2 accommodated in the cartridges 10 at both ends and have a function and structure to finish and surround the appearance of the secondary battery module 100.

Figure 3:
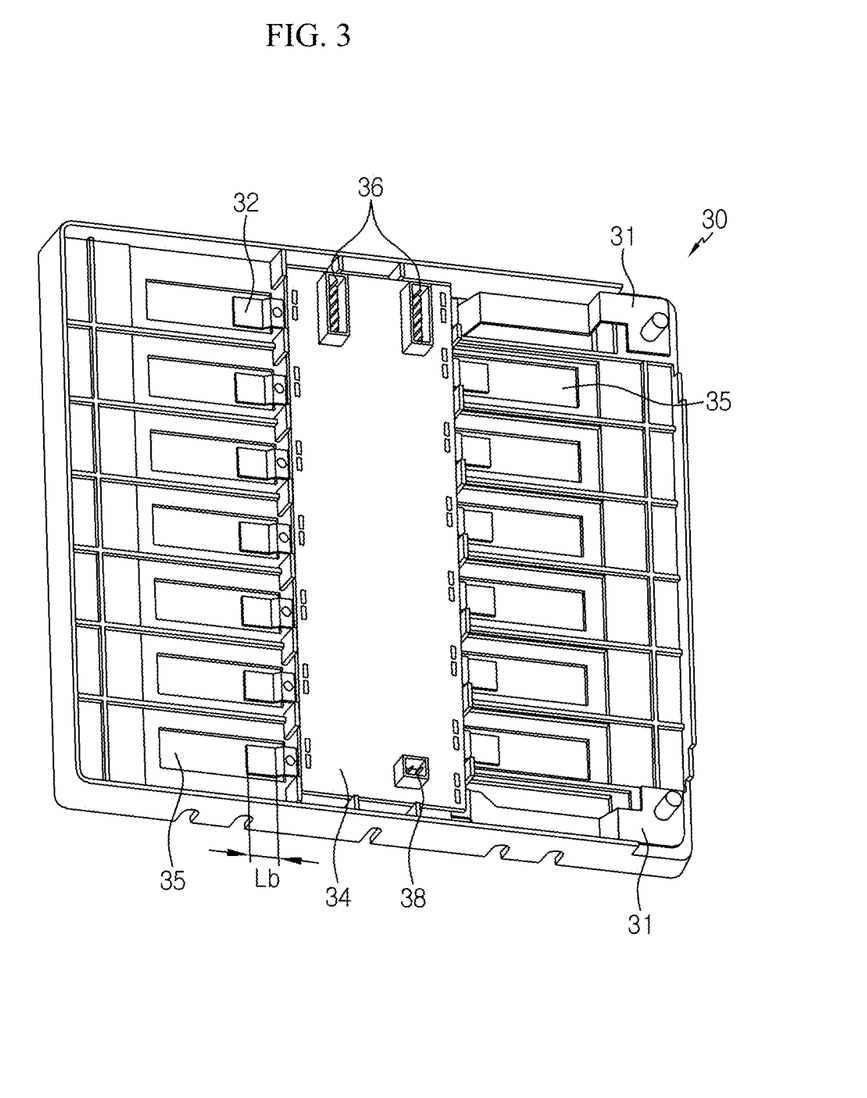
FIG. 3 is a partial perspective view showing a sensing housing available for the secondary battery module according to an embodiment of the present disclosure.
Figure 4:
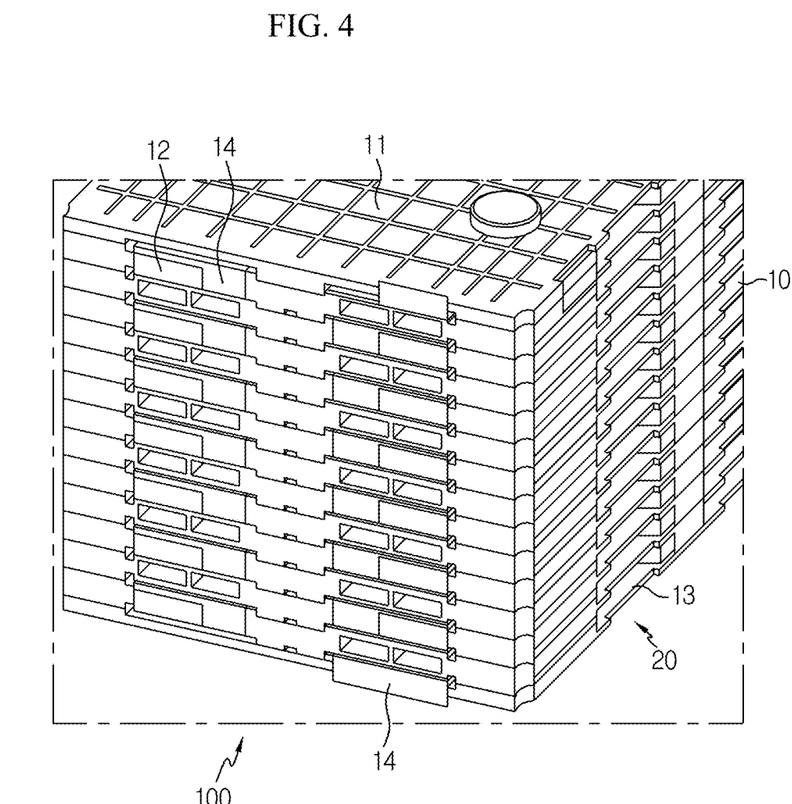
FIG. 4 is a partial perspective view showing a cartridge assembly available for the secondary battery module according to an embodiment of the present disclosure.
Figure 5:
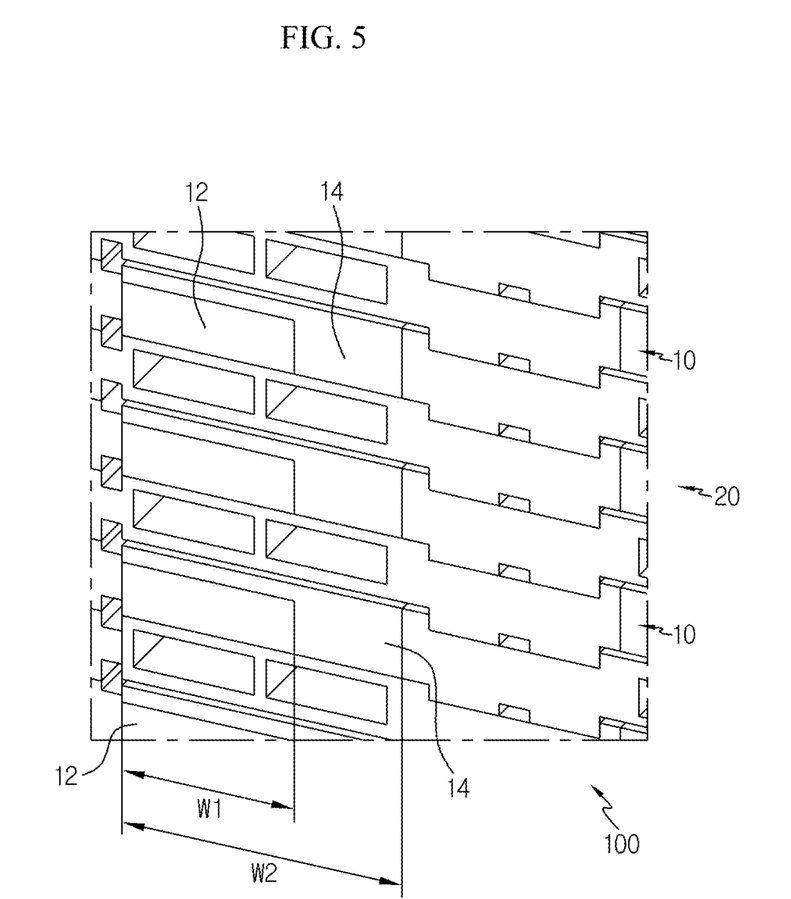
FIG. 5 is an enlarged view showing a portion A of FIG. 4.

FIG. 3 is a partial perspective view showing a sensing housing available for the secondary battery module according to an embodiment of the present disclosure, FIG. 4 is a partial perspective view showing a cartridge assembly available for the secondary battery module according to an embodiment of the present disclosure, and FIG. 5 is an enlarged view showing a portion A of FIG. 4.

Referring to FIGS. 1 to 5, the sensing housing 30 is provided with a plurality of bus bars 32 corresponding to the lead overlapping portions 16, respectively. Each bus bar 32 may be made of, for example, copper. In addition, the sensing housing 30 may be injection-molded in an approximately rectangular shape by, for example, insulating plastic, and a plurality of accommodation holes 35 capable of respectively accommodating the bus bars 32 are formed therethrough in a predetermined pattern. At an approximate center of the sensing housing 30, a BMS circuit board 34 functioning to collect voltage and/or temperature data of each cell 2 sensed by the corresponding bus bar 32, balancing the corresponding cell 2 by means of the collected data, and transferring the data to another controller (not shown) of the module is installed. The BMS circuit board 34 is electrically connected to one end of each bus bar 32.

The first lead 12 and the second lead 14 extend and bend from a side of each cell 2 by a predetermined length and have a predetermined width, respectively. The first lead 12 of each cell 2 is bent by 90 degrees upwards on the drawing, and the second lead 14 is bent 90 degrees downwards on the drawing. As shown in FIG. 5, a width W1 of the first lead 12 is shorter than a width W2 of the second lead 14, and thus the sum of the width W1 of the first lead 12 and a length Lb of the bus bar 32, explained later, may be substantially identical to the width W2 of the second lead 14.

In FIG. 3, the reference sign 36 represents a pair of data communication ports for exchanging data between BMS circuit board 34, when a plurality of secondary battery modules 100 are coupled, and the reference sign 38 represents a temperature data port for receiving a signal of a temperature sensor (not shown) for measuring an internal temperature of the secondary battery module 100. The reference sign 31 respectively represents a positive electrode terminal and a negative electrode terminal of the secondary battery module 100.

As described above, the first lead 12 of the cell 2 of each lead overlapping portion 16 is configured to have a shorter width than the second lead 14 having a polarity opposite to the first lead 12 as much as a predetermined width, and when the sensing housing 30 is coupled to the cartridge assembly 20, the second lead 14 and the bus bar 32 may be welded by means of, for example, laser welding in a state where each corresponding bus bar 32 come into contact with the second lead 14 substantially on the same line as the first lead 12. According to a modified embodiment, it would be understood by those skilled in the art that the first lead 12, the second lead 14, and the bus bars 32 corresponding thereto may also be coupled together by ultrasonic welding.

Figure 7:
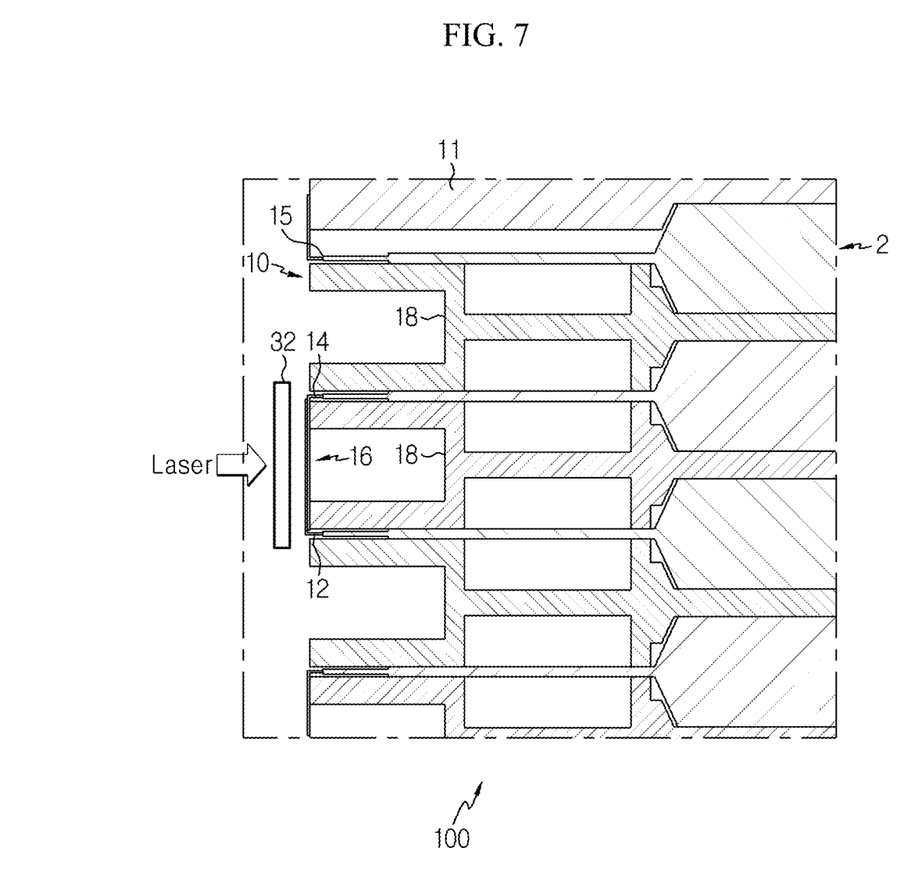
FIG. 7 is a schematic diagram for illustrating a welding process between a bus bar of the sensing housing and each cell lead, when the secondary battery module according to an embodiment of the present disclosure is assembled.

FIG. 6 is a cross-sectioned view showing a curved portion of a secondary battery module according to an embodiment of the present disclosure, and FIG. 7 is a schematic diagram for illustrating a welding process between a bus bar of the sensing housing and each cell lead, when the secondary battery module according to an embodiment of the present disclosure is assembled.

Referring to FIGS. 6 and 7, the sensing housing 30 is coupled to a side of the cartridge assembly 20 in a state where the first lead 12 and the second lead 14 of the cells 2 adjacent to the respective lead overlapping portions 16 overlap with each other in contact, thereby configuring the secondary battery module 100. In this case, the bus bar 32, the first lead 12 and the second lead 14 are positioned in order in a direction from the outside of the module 100, namely from a side where laser welding is performed, toward the cartridge assembly. In this arrangement, when welding is performed between the leads 12, 14 and between the bus bar 32 and the leads 12, 14 in this deployed state, particularly when laser is irradiated in a direction substantially perpendicular to the sensing housing 30, each cartridge 10 has a barrier 18 on a side thereof in order to protect the cells 2 accommodated in each cartridge 10. It will be fully understood by those skilled in the art that the barrier 18 serves as a blocking wall to prevent a laser (not shown) emitting from a laser device (not shown) from being directly irradiated onto the cell 2.

According to an embodiment of the present disclosure, in order to configure the secondary battery module in a compact design to enhance energy efficiency to the maximum, the leads 12, 14 of each cell 2 may be bent at a right angle at a point of about 0.8 to 1.2 mm from a lead insulating unit 15 in state of being accommodated in the corresponding cartridge.

Figure 8:
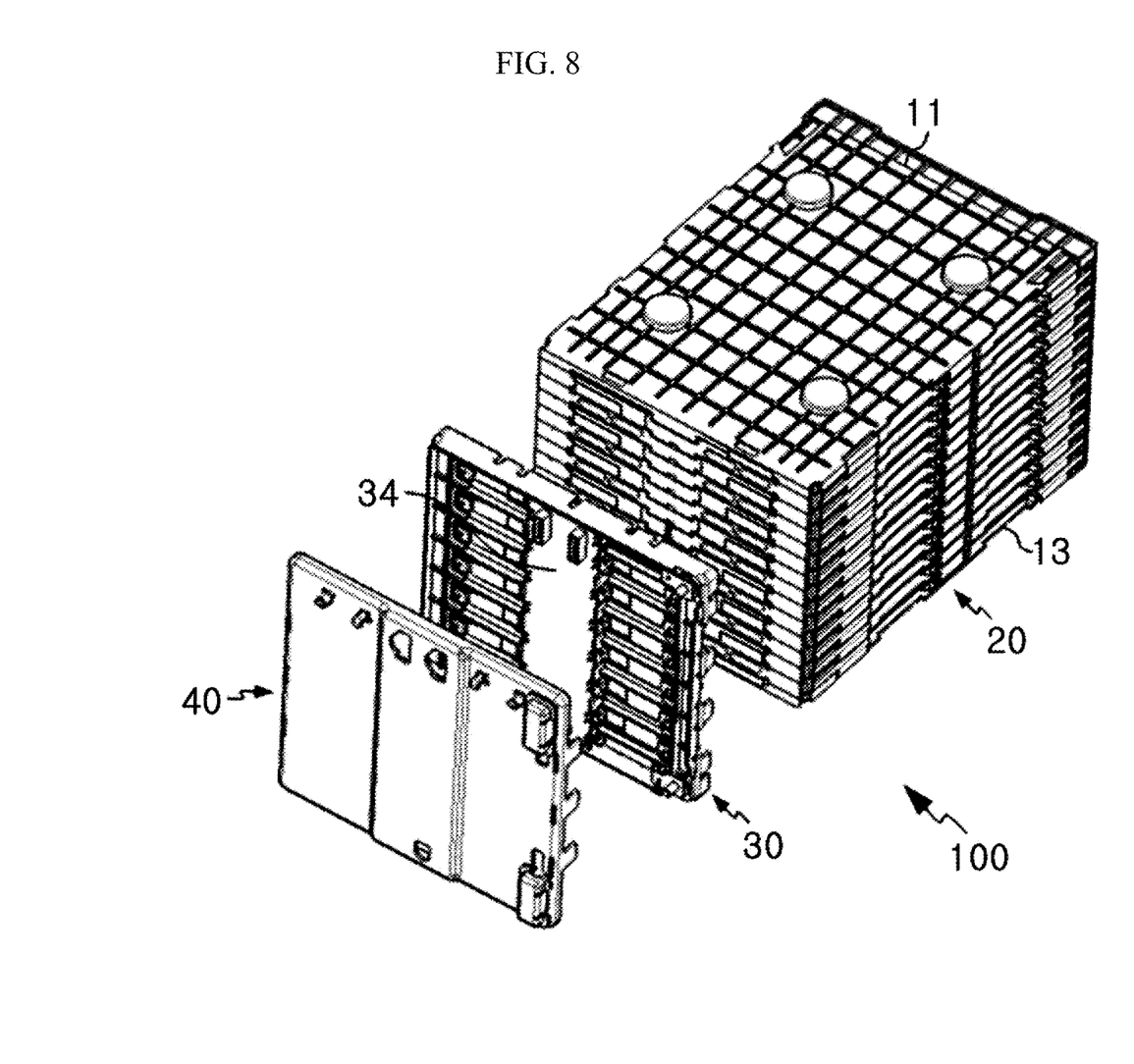
FIG. 8 is an exploded perspective view showing a secondary battery module according to an embodiment of the present disclosure.
Figure 9:
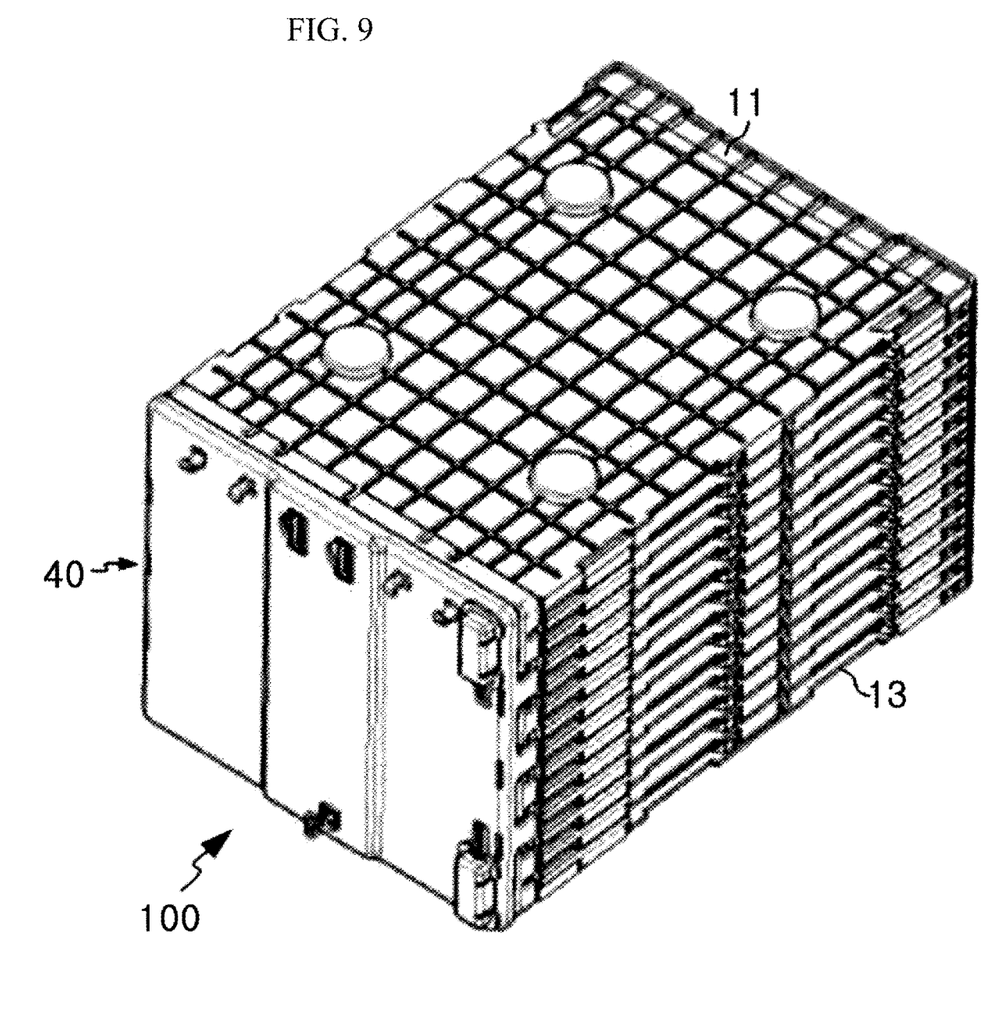
FIG. 9 is a perspective view of FIG. 8 in an assembled state.

Referring to FIG. 8 which is an exploded perspective view showing the secondary battery module according to an embodiment of the present disclosure a the present disclosure, which is net yet completely assembled, and FIG. 9 which is a perspective view in a completely assembled state, in a state where the sensing housing 30 is coupled to the cartridge assembly 20, a sensing cover 40 is coupled to the sensing housing 30 to protect the BMS circuit board 34 and bus bar 32. The sensing cover 40 may be coupled to the sensing housing 30 by means of snap-fitting or hooking.

A method for welding electrode leads of a secondary battery module according to another embodiment of the present disclosure will be described.

First, a plurality of cells 2 in which a width W1 of the first lead 12 is shorter than a width W2 of the second lead 14 (for example, as much as a length Lb of each bus bar 32, and leads 12, 14 with opposite polarities are bent in opposite directions. Here, it could be fully understood that the width W1 of the first lead 12 may be shorter than the width W2 of the second lead 14 when the leads are initially manufactured, or the first lead 12 and the second lead 14 may be manufactured to have the same width and then the first lead 12 of each cell 2 may be cut by a predetermined length so that the first lead 12 have the width W1. In addition, in a state where the cell 2 is accommodated in the corresponding cartridge 10, the leads 12, 14 of the cell may be bent at a point of approximately 0.8 to 1.2 mm, preferably 1 mm, from the lead insulation portion 15 at a right angle, thereby maximizing the energy efficiency.

Subsequently, a plurality of cartridges 10 respectively accommodating the cells 2 are stacked to form the cartridge assembly 20 so that the leads 12, 14 of the neighboring cells 2 with opposite polarities overlap with each other and thus the lead overlapping portions 16 are positioned in a predetermined pattern on the sidewall of the cartridges 10. Each cartridge 10 of the cartridge assembly 20 may include an accommodation portion capable of accommodating the cell 2, and may also have a hook or a slot so that a pair of adjacent cartridges 10 may be coupled to each other by means of snap-fitting or hooking, as being easily understood by those skilled in the art. In addition, at both sides of the cartridge assembly 20, the upper cover 11 and the lower cover 13 which may accommodate and protect the cell 2 are coupled to each other by means of, for example, snap-fitting or hooking. In addition, the cartridge 10 at which the first lead 12 and the second lead 14 are placed may employ a cartridge having a barrier 18 at a side thereof so that the cell 2 may be protected against the laser during the laser welding operation described below.

Next, the sensing housing 30 having a plurality of bus bars 32 respectively installed corresponding to respective lead overlapping portions 16 is coupled to a side of the cartridge assembly 20 by means of snap-fitting or hooking so that the corresponding bus bar 32 may come into contact with the second lead 14 substantially on the same line as the first lead 12. In this case, as described above, the bus bars 32 are arranged in the sensor housing 30 in advance with a predetermined pattern. Here, the first lead 12 is made of aluminum, and the second lead 14 and the bus bar 32 are made of copper.

Finally, the second lead 14 and the bus bar 32 of each lead overlapping portion 16 are welded. In this stage, a welding system having a plurality of welding points may be used, and also an individual laser welder may be used to perform point welding several times. In addition, it would be fully understood by those skilled in the art that a separate laser welder or welding point may be used between the first lead 12 and the second lead 14. Moreover, the laser welder may irradiate laser in a direction substantially perpendicular to the sensing housing 30.

The secondary battery modules 100 according to the above embodiments may electrically connected to each other in series or in parallel and are accommodated in a predetermined case to provide a compact secondary battery pack for a power storage device for a home photovoltaic (PV) solar energy panel.

The foregoing description is merely illustrative of the technical features of the present disclosure, and various modifications and variations can be made by those having ordinary skill in the art without departing from the essential characteristics of the present disclosure. Therefore, the embodiments disclosed herein are not intended to limit but to illustrate the technical features of the present disclosure, and the scope of the technical features of the present disclosure is not limited by these embodiments. The scope of the present disclosure should be construed according to the appended claims, and all technical features falling within its equivalent scope should be construed as being included in the scope of the present disclosure.

INDUSTRIAL APPLICABILITY

The present disclosure relates to a method for welding electrode leads of a secondary battery module and a compact secondary battery module using the same, and is particularly applicable to industries related to welding of electrode leads of a secondary battery module.

What is claimed is:
1. A compact secondary battery module, comprising:
   a cartridge assembly having a plurality of cartridges stacked in a first direction;
   a plurality of battery cells accommodated in the plurality of cartridges, respectively, so that a plurality of lead overlapping portions where leads of adjacent cells overlap with each other are located at a cartridge sidewall, wherein the plurality of battery cells includes a first battery cell accommodated in a first cartridge and a second battery cell accommodated in a second cartridge;
   a first lead of the first battery cell having a bent portion bent at a right angle to the cartridge to extend in the first direction toward the second battery cell;
   a second lead of the second battery cell having a bent portion bent at a right angle to the cartridge to extend in the first direction toward the first battery cell and overlapping the first lead; and
   a sensing housing having a plurality of bus bars located and welded corresponding to the lead overlapping portions, respectively, the sensing housing arranged at a side of the cartridge assembly,
   wherein the bent portion of the first lead is configured to have a width in a second direction that is less than a width in the second direction of the bent portion of the second lead, the second lead having a polarity opposite to the first lead, the second direction being in a same plane as the first direction, wherein when the sensing housing is coupled to the cartridge assembly, a corresponding bus bar comes into contact with the second lead,
   wherein a combined width of the bent portion of the first lead and width of the corresponding bus bar in the second direction is equal to the width of the bent portion of the second lead,
   wherein the first lead is stacked on the second lead in a third direction and the bus bar is stacked on the second lead in the third direction, the third direction being perpendicular to the first direction and second direction,
   wherein the second lead and the bus bar are welded to each other,
   wherein the sensing housing comprises:
      a battery management system (BMS) circuit board; and
      a first row of accommodating holes on a first side of the BMS circuit board and a second row of accommodating holes on a second side of the BMS circuit board,
      wherein each of the plurality of bus bars extends into one of the accommodating holes.
2. The compact secondary battery module according to claim 1, further comprising:

a barrier provided at a side of each cartridge to protect the cell during a welding work.

3. The compact secondary battery module according to claim 1, wherein the lead of each cell is bent at a right angle at about 1 mm from a lead insulation portion in a state of being accommodated in the corresponding cartridge.

4. The compact secondary battery module according to claim 1, wherein the bus bar and the second lead are made of copper, and the first lead is made of aluminum.

5. The compact secondary battery module according to claim 1, wherein the sensing housing further includes a battery management system (BMS) circuit board configured to manage voltage and/or temperature data of each cell detected by each bus bar.

6. The compact secondary battery module according to claim 5, wherein the sensing housing is coupled to the cartridge assembly by means of snap-fitting or hooking.

7. The compact secondary battery module according to claim 5, further comprising:
a sensing cover coupled to the sensing housing.

8. The compact secondary battery module according to claim 7, wherein the sensing cover is coupled to the sensing housing by means of snap-fitting or hooking.

9. The compact secondary battery module according to claim 1, wherein two neighboring cartridges of the cartridge assembly are coupled to each other by means of hooking.

10. The compact secondary battery module according to claim 1, wherein the cartridge assembly further includes an upper cover and a lower cover coupled to cartridges at both ends thereof by means of hooking.

11. A method for welding electrode leads of a compact secondary battery module, comprising:
forming a cartridge assembly by stacking a plurality of cartridges in a first direction, each cartridge accommodating a battery cell, so that lead overlapping portions where leads of adjacent cells with opposite polarities overlap with each other are formed at a cartridge sidewall;
preparing a plurality of cells having leads which have opposite polarities and are bent at right angles in opposite directions and forming a first lead to have a width in a second direction that is less than a width in the second direction of a second lead, the second direction being in a same plane as the first direction;
disposing a sensing housing having a plurality of bus bars respectively installed corresponding to the lead overlapping portions at a side of the cartridge assembly so that a corresponding bus bar comes into contact with the second lead by stacking the first lead on the second lead in a third direction and stacking the bus bar on the second lead in the third direction, the third direction being perpendicular to the first direction and second direction; and
welding the second lead and the bus bar of each lead overlapping portion,
wherein a combined width of the first lead and a width of the corresponding bus bar in the second direction is equal to the width of the second lead,
wherein the sensing housing comprises:
a battery management system (BMS) circuit board; and
a first row of accommodating holes on a first side of the BMS circuit board and a second row of accommodating holes on a second side of the BMS circuit board,
wherein each of the plurality of bus bars extends into one of the accommodating holes.

12. The method for welding electrode leads of a compact secondary battery module according to claim 11, wherein in forming the cartridge assembly, a cartridge having a barrier at each sidewall where the first lead and the second lead are disposed is used.

13. The method for welding electrode leads of a compact secondary battery module according to claim 11, further comprising bending each lead at a right angle at about 1 mm from a lead insulation portion of the cell in a state of being accommodated in the corresponding cartridge.

14. The method for welding electrode leads of a compact secondary battery module according to claim 11, wherein the welding is performed with a laser welder.

15. The method for welding electrode leads of a compact secondary battery module according to claim 14, wherein a laser irradiation direction of the laser welder is substantially perpendicular to the sensing housing.

16. The method for welding electrode leads of a compact secondary battery module according to claim 11, wherein the bus bar and the second lead are made of copper, and the first lead is made of aluminum.

17. A compact secondary battery module, manufactured by the method of claim 11.

18. A secondary battery pack, comprising the compact secondary battery module defined in claim 17.

* * * * *